Patented May 5, 1925.

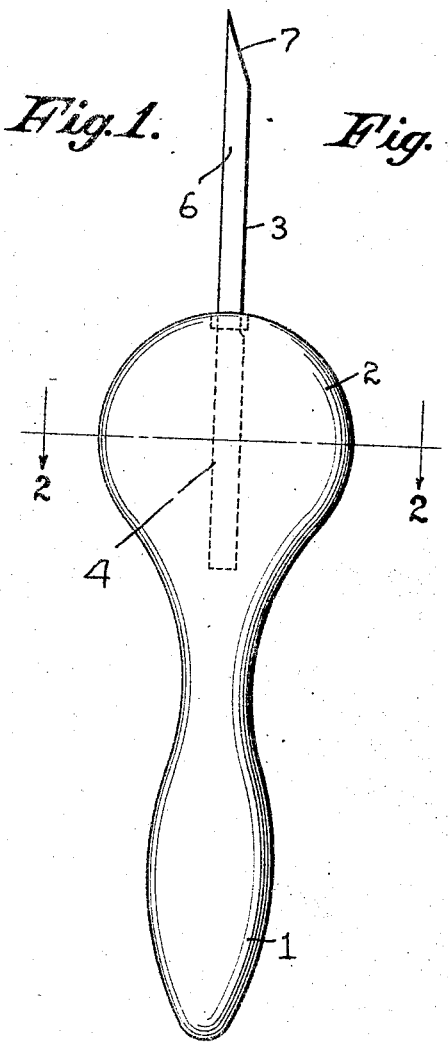
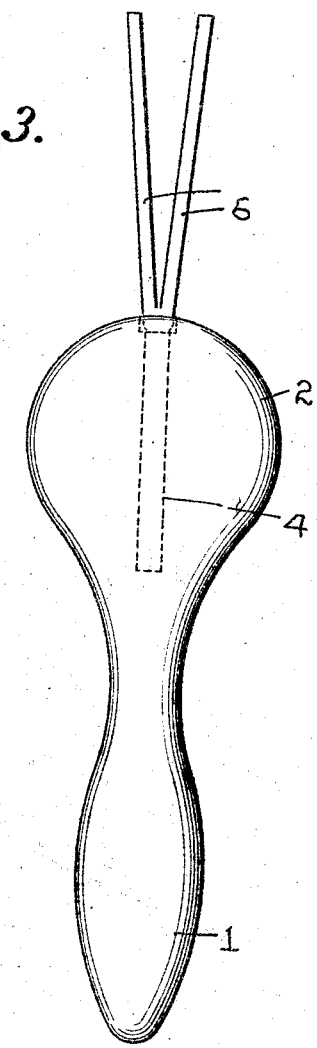
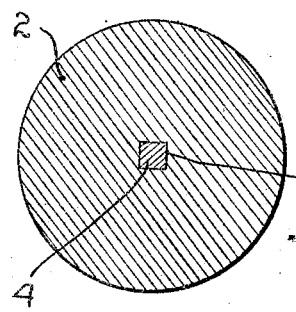

1,536,620

UNITED STATES PATENT OFFICE.

FRED W. NEWELL, OF SEATTLE, WASHINGTON.

WEEDER.

Application filed March 18, 1924. Serial No. 700,159.

*To all whom it may concern:*

Be it known that FRED W. NEWELL, a citizen of the United States, residing at Seattle, in the county of King and State of Washington, has invented certain new and useful Improvements in Weeders, of which the following is a specification.

This invention relates to an improvement in weeding devices preferably constructed as a rigid element, and adapted for use by hand and particularly for removing weeds from lawns and the like.

The invention is particularly directed to a weeder of this type in which the weed may be effectively engaged and removed with a minimum disturbance of the earth beyond the weed.

The invention is illustrated in the accompanying drawings, in which:

Fig. 1 is a plan view of the improved implement.

Fig. 2 is a side elevation of the same.

Fig. 3 is a transverse section.

The improved weeder comprises a handle portion 1, which may be of wood, metal, or other desired material, and which is formed with an enlarged spherical end 2.

The weeding blade comprises a prong member 3, having a shank 4 adapted to seat in an appropriately formed opening 5 in a spherical terminal 2 of the handle, the shank and opening being preferably non-circular in cross section, and frictionally engaging to provide a rigid connection.

The prongs 6 of the member 3 are divergent from the shank and are of less width than thickness, that is, the transverse dimension of the prongs in plan is less than the transverse dimension in elevation. The free ends of the prongs are cut away at 7 and form sharpened terminals or points.

In use, the prongs are forced into the ground on each side of the weed to be removed until the weed is centered and grasped between the prongs, whereupon the implement is rocked on the spherical end as a fulcrum to pull the weed. The relative transverse dimensions of the prongs provide in the narrow edge in plan for slight disturbance of the ground in the use of the implement, while the comparatively wide edge in side elevation provides the requisite strength.

While it is preferred that the implement be made in two parts, it is of course obvious that it may be made as a single casting, if desired.

What I claim is:

In a weeding implement, a handle having an enlarged spherical end, and a weeding blade secured in said spherical end and having divergent prongs projecting therebeyond, said prongs being of less width than height.

In testimony whereof I affix my signature.

FRED W. NEWELL.